US006648107B2

United States Patent
Lundholm et al.

(10) Patent No.: US 6,648,107 B2
(45) Date of Patent: Nov. 18, 2003

(54) DEVICE FOR OPERATING A PARKING BRAKE

(75) Inventors: Fredrik Lundholm, Lulea (SE); Jesper Marklund, Vanersborg (SE)

(73) Assignee: Volvo Personvagnar AB, Güteborg (CH)

( * ) Notice: Subject to any disclaimer, the term of this patent is extended or adjusted under 35 U.S.C. 154(b) by 0 days.

(21) Appl. No.: 09/681,426

(22) Filed: Mar. 31, 2001

(65) Prior Publication Data

US 2001/0030093 A1 Oct. 18, 2001

Related U.S. Application Data

(63) Continuation of application No. PCT/SE99/01754, filed on Oct. 1, 1999.

(51) Int. Cl.[7] .............................................. F16D 65/36
(52) U.S. Cl. .......................... 188/156; 188/20; 74/491
(58) Field of Search .......................... 74/491, 496, 560; 188/265, 156, 2 D, 162; 303/70; 70/237–260

(56) References Cited

U.S. PATENT DOCUMENTS

| 3,875,820 A | * | 4/1975 | Morden ...................... 188/162 |
| 4,265,345 A | * | 5/1981 | Fasano ........................ 477/194 |
| 4,991,699 A | * | 2/1991 | Hiraiwa et al. ............. 192/222 |
| 5,003,799 A | * | 4/1991 | Imai et al. ................ 192/220.2 |
| 5,127,245 A | * | 7/1992 | Imai et al. ................ 192/219.4 |
| 5,251,968 A | * | 10/1993 | Rath .......................... 188/349 |
| 5,314,049 A | * | 5/1994 | Nordstrom .................. 180/271 |
| 5,485,764 A | * | 1/1996 | Sugimoto et al. ........... 188/2 D |
| 5,555,773 A | * | 9/1996 | Nanno et al. ................. 74/512 |
| 5,590,744 A | * | 1/1997 | Belmond .................... 188/2 D |
| 5,950,782 A | * | 9/1999 | Brauns et al. ............. 192/3.63 |
| 6,079,794 A | * | 6/2000 | Drott ..................... 188/1.11 E |
| 6,213,259 B1 | * | 4/2001 | Hanson et al. ............... 188/156 |
| 6,244,394 B1 | * | 6/2001 | Gutierrez et al. ............ 188/156 |
| 6,279,692 B1 | * | 8/2001 | Siepker et al. .............. 188/105 |
| 6,297,207 B1 | * | 10/2001 | Willey et al. ................ 510/301 |

FOREIGN PATENT DOCUMENTS

WO  WO 9856633 A1  12/1998

* cited by examiner

*Primary Examiner*—Jack Lavinder
*Assistant Examiner*—Robert A. Siconolfi
(74) *Attorney, Agent, or Firm*—Howrey Simon Arnold & White LLP (57) ABSTRACT

Apparatus for a lever (6) for controlling a parking brake including brake units and an electrically driven tightening means for applying or releasing a braking force on the said brake units. Characteristic of the invention is that a means is arranged to detect the position of the lever and produce control signals to a first electric motor (12) for generating a brake force corresponding to the position of the lever. The lever can be adjusted manually. Further there is a second electric motor (49) intended to automatically control the lever (6) depending on incoming control signals. In the fully applied position the lever (6) is locked against manual adjustment.

17 Claims, 13 Drawing Sheets

DEVICE FOR OPERATING A PARKING BRAKE

CROSS REFERENCE TO RELATED APPLICATIONS

This is a continuation patent application of International Application Number PCT/SE99/01754 filed Oct. 1, 1999 which designates the United States; the disclosure of that application is expressly incorporated by reference in its entirety.

BACKGROUND OF INVENTION

1. Field of the Invention

The present invention relates to an apparatus for a lever for controlling a parking brake intended for vehicles including brake units such as drum brakes or disc brakes on two opposing wheels in a pair of wheels and an electrically driven tightening means for applying or releasing a braking force on the said brake units.

2. Background Information

A large number of suggestions for electrically maneuvered parking brakes for replacing conventional hand controlled parking brakes are known. Electrically maneuvered hand brakes are described for instance in GB 04 38 A, WO 92 1142 and EPO 398 46 A2.

SUMMARY OF INVENTION

The purpose of the present invention is to achieve an electrically maneuvered parking brake lever with a number of advantages compared to previously known designs. This is achieved according to the invention mainly through at least one sensor arranged to sense the position of the maneuver lever and provide control signals to a first electrical motor. The electrical motor drives a tightener for generating braking power corresponding to the position of the lever. In addition to being electrically maneuverable, the lever is also manually adjustable. A second electrical motor is arranged to maneuver the lever depending on control signals being input to it, and that when the lever is completely tightened in a locked position the same second electrical motor being arranged to lock the lever and prevent hand adjustment.

The present invention offers the following advantages, among others:

- Clear indication to the driver of when the brake has been automatically set or released because the lever moves to the right position by itself.
- Simple function and use.
- Good child protection. An extra child protection lock is automatically applied when certain situations occur, such as when the driver leaves his seat, without making normal use difficult.
- The braking powers are adjustable to desired levels using appropriate springs.
- The apparatus can be fitted to all types of electrical parking brakes by proper positioning.
- Installation is simple as the whole apparatus can be made in a module.
- Placement in the car can be changed without affecting the function of the apparatus.

BRIEF DESCRIPTION OF DRAWINGS

In the following the invention will be described in more detail with reference to embodiments shown in the attached drawings, wherein.

DETAILED DESCRIPTION

Figure 1:
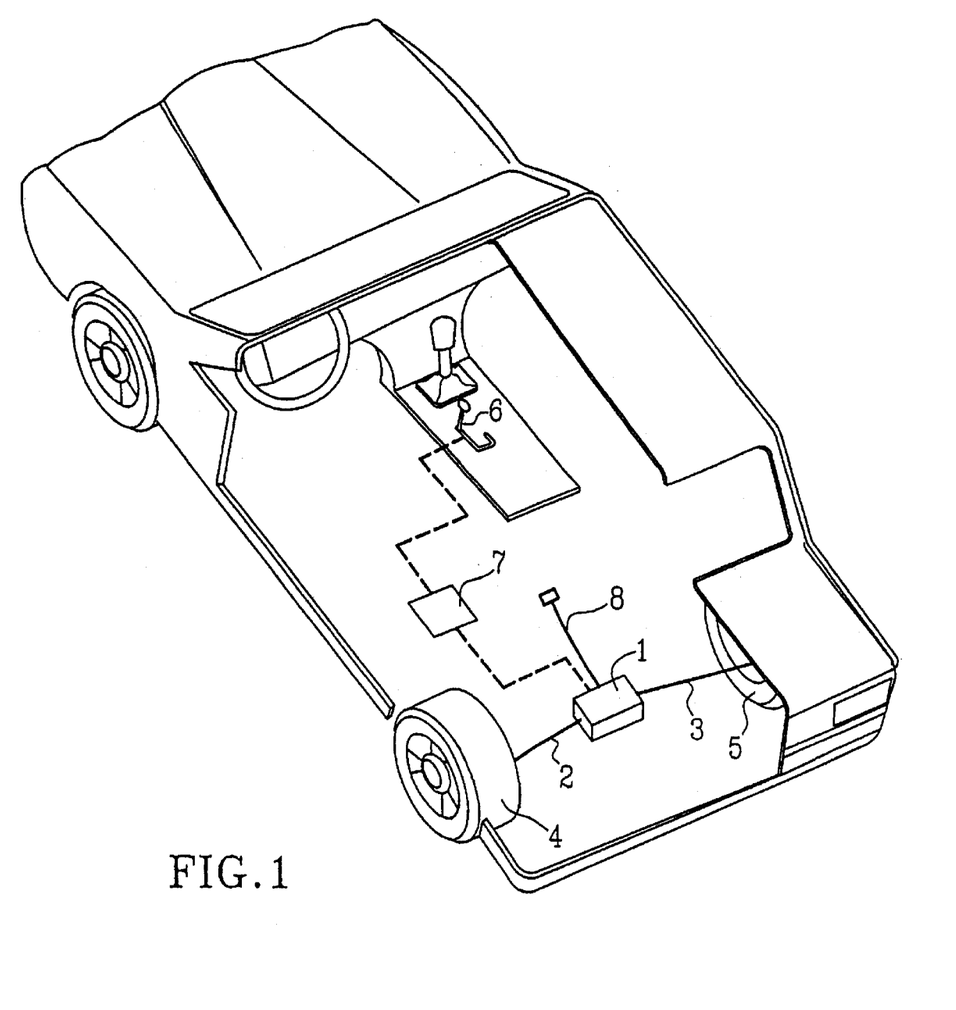
FIG. 1 is a schematic of a section through a car illustrating appropriate positioning of the main parts of the parking brake according to the present invention.

In FIG. 1 a plastic box 1 is illustrated having therein a brake activation unit. From that activation unit brake wires 2, 3 extend to brake units in the two wheels 4, 5. A lever 6 for maneuvering the parking brake is arranged in the middle console of the car. The lever 6 and the activation unit in the plastic box 1 are coupled to an electric control unit 7. A mechanical release wire 8 is available for manually releasing the brake in case of current failure or other electrical fault.

Figure 2:
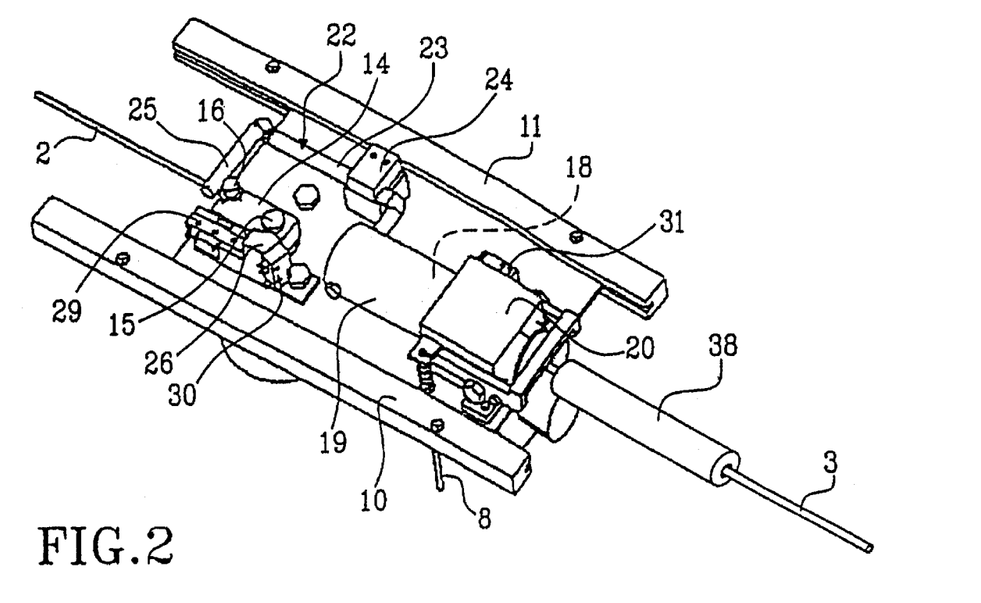
FIG. 2 is a top perspective view of the brake activation unit for activating the two brake units of a pair of wheels with the said activation unit in a position illustrating a released parking brake.
Figure 3:
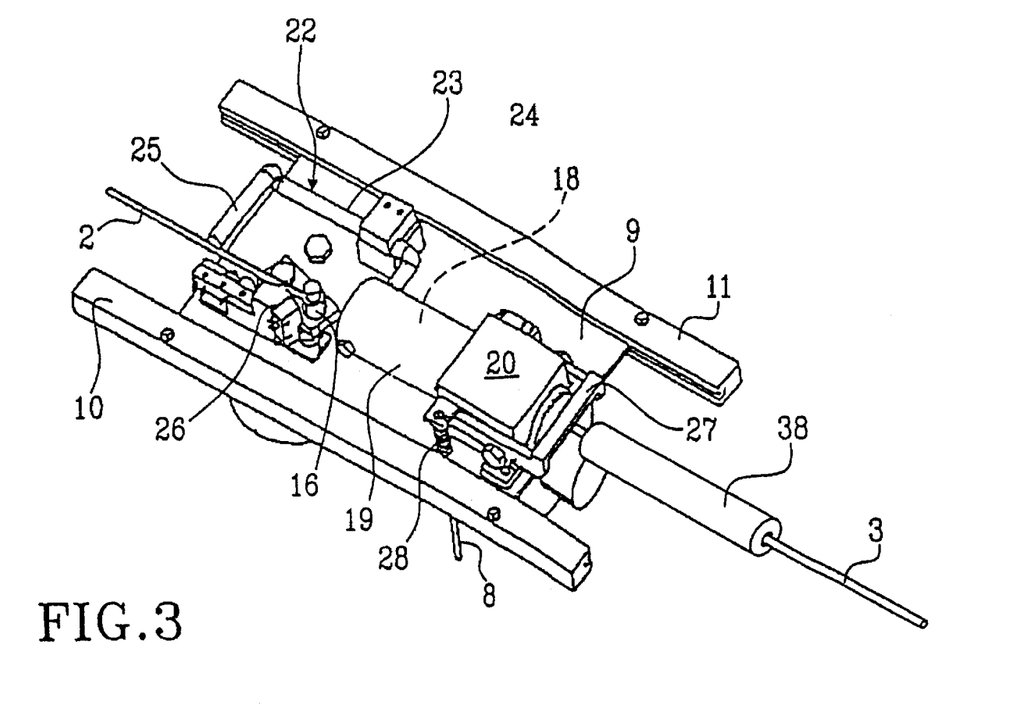
FIG. 3 is a top perspective view of the brake activation unit according to FIG. 2 in a position illustrating a set parking brake.
Figure 4:
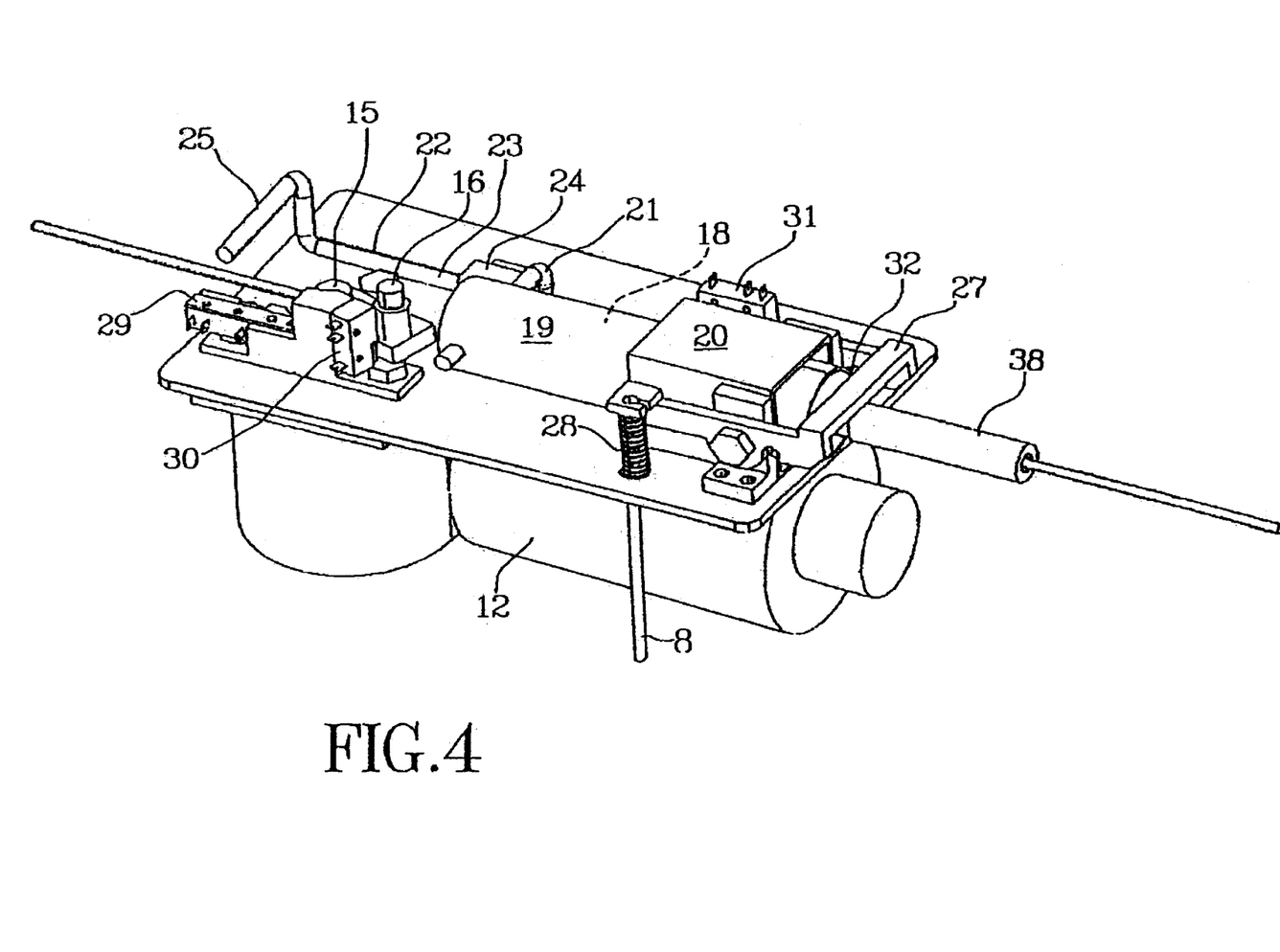
FIG. 4 is a side perspective view providing further details of the brake activation unit according to FIG. 3 without the glide rails.

Referring to FIGS. 2–4, a glider 9 is shown. It is adjustably placed in glide rails 10, 11 and is attached at one end to a first brake wire 2 and at the other end to second brake wire 3. Underneath the glider 9 is an electric motor 12 that, via its gearbox, drives a lever arm 14 swingably attached to the glider 9. The axle of the lever arm 14 is designated 15 in the drawings. On the free end of the lever arm 14 there is a lever arm peg 16 to which the first brake wire 2 is attached. The second brake wire 3 is coupled to the glider 9 via a wire stretcher 38 and a spring package in which there is an energy storage spring 18 (see also FIG. 7). The wire stretcher 38 can be equipped with a strain gauge (not shown).

In the spring package there is an outside cylinder 19 containing the spring 18. It is adjustably attached to a cylinder guide 20 and attached by one end to a shank 21 on a bent rod, in the following designated return 22, the middle part 23 of which is adjustably attached to the glider 9 in a return holder 24. The return 22 has a second shank 25 on the other side of the lever arm peg 16 relative to the outer cylinder 19 of the spring package. In the position shown in FIG. 2, the return"' second shank 25 lies against the lever arm peg 16, which sticks up above the other shank 21. In FIGS. 3 and 4, the lever arm 14 has swung from its unloaded original position shown in FIG. 2 and rests against a stop lug 26.

In the position of the lever arm 14 shown in FIGS. 3 and 4, the spring package with the spring 18 therein is held in position on the glider 9 only by the lock 27, in its normal locked position retains the outer cylinder 19 and takes up the stress in the other wire 3. Upon pulling the release wire 8, the lock 27 is lifted against a pressure spring 28 out of its locking position. This manual mechanical release mechanism is described in more detail below in connection to FIGS. 5 and 6.

On the glider 9 there is a number of micro-switches. A first one 29 indicates the original position of the lever arm peg 16, a second one 30 indicates the final position of the lever arm peg, and a third one 31 indicates when the brake is mechanically released through the release wire 8.

The parking brake is released when the activation unit is in the position shown in FIG. 2. The electrical motor 12 is arranged to swing the lever arm 14 when the brake is activated, whereby the lever arm peg 16 makes a clockwise rotational movement from its original position to its final position simultaneously pulling and thus stretching the first wire 2. The glider 9, which is arranged to glide in the glide rails 10, 11, is moved by the first wire 2, with the reaction force taken up by the second wire 3. Accordingly, the same force is always applied to the two wires. The gearbox of the electric motor 12 is self-regulating, which means that the lever arm 14 can be stopped and held in any position. This makes dynamic braking with the parking brake possible.

When the vehicle is to be parked, the lever arm 14 is drawn to its final position as shown in FIGS. 3 and 4. In that position the lever arm peg 16, and therefore the force vector of the wire 2, has passed the rotation center 15 of the lever arm 14, pressing the lever arm 14 against the stop lug 26 and holding it in that self-locking position. The system is adjusted so that a somewhat greater than necessary force is applied to the wires. The energy storage spring 18, which is pre-compressed to the necessary applied force, is thereby further compressed to compensate for any force changes that may occur, for example, in connection with cooling off the brake discs. When the parking brake is drawn, the lever arm 14 can be returned to its original position by electric motor 12 thereby releasing the brake.

Figure 5:
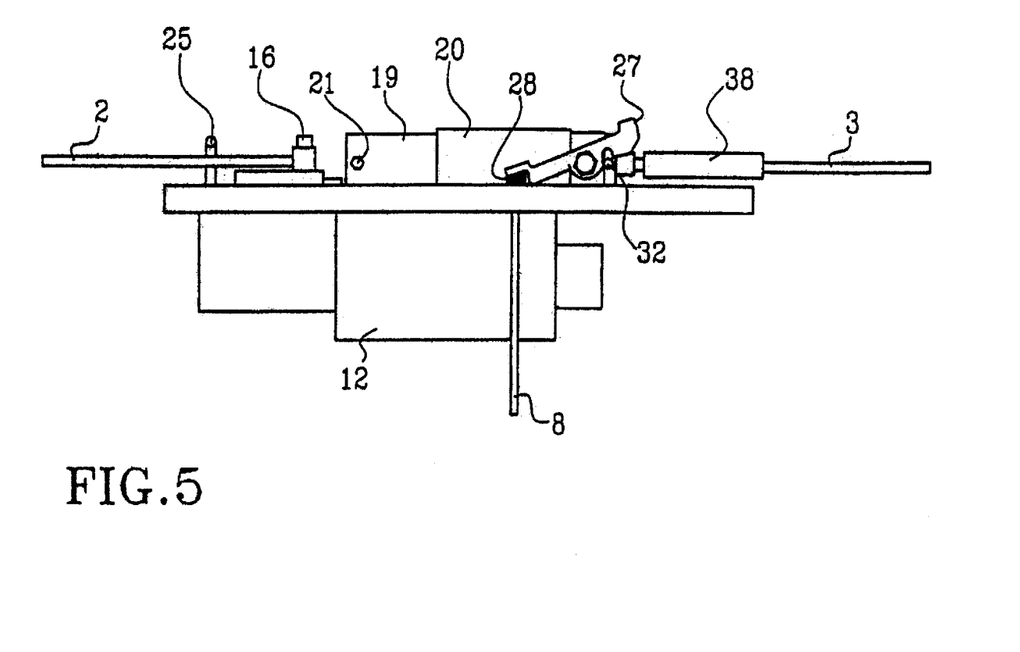
FIG. 5 is a side planar view of the brake activation unit according to FIG. 2 illustrating a mechanism for manual mechanical release of the parking brake when the brake has just been released.

As mentioned above, in the activation unit there is a manual mechanical release mechanism whereby the parking brake can be released if the electric motor 12 does not work, for instance, because of a discharged battery. The function of the manual mechanical release mechanism is best clarified by FIGS. 5 and 6. In FIG. 5, the lock 27 has been lifted up out of engagement with lock pegs 32 on the outside cylinder 19 by pulling the release wire 8, thereby releasing the outside cylinder 19. The spring package can now be brought out of its previously fixed position shown in FIG. 5 by the force of the wire. When the outside cylinder slides in the cylinder guide 20, the glider 9 is also moved until the wires 2,3 slacken and the parking brake is deactivated.

Figure 6:
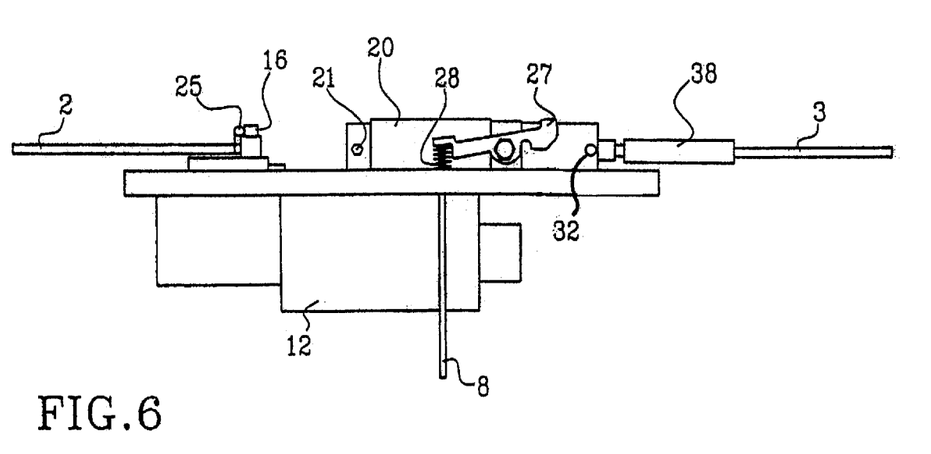
FIG. 6 is a side planar view of the brake activation unit according to FIG. 2 illustrating a mechanism for manual mechanical release of the parking brake when the parking brake has been deactivated.

The return 22 described above, which moves with the outside cylinder 19 when it is freed, comprises a connection between the energy storage spring 18 and the lever arm 14 of the electric motor 12.

When the electric motor 12 is again functional and the lever arm 14 returns to its original position, the return 22 is pressed back by the lever arm peg 16 and the outside cylinder 19 is brought back to its original position as shown in FIG. 5. In that position the pressure spring 28 forces the lock 27 to engage against the outside cylinder 19. The parking brake is thus automatically made functional when the manual mechanical release mechanism is used and the electric motor is again functional. A significant advantage of this is that the vehicle does not need to be driven to a garage each time the release mechanism has been used.

Figure 7:
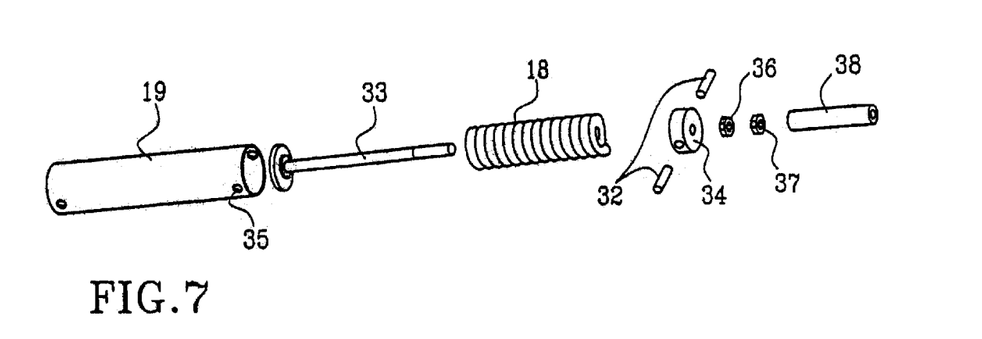
FIG. 7 is an exploded perspective of an energy storage spring package included in the brake activation unit according to FIG. 2.

The spring package according to FIG. 7, which as mentioned above is placed on the glider 9 and in terms of force connected to the other wire 3, consists of the outside cylinder 19, a rod 33 placed in it, the spring 18, a stop 34, the lock pegs 32 which are fastened to the stop and which in applied position extend out of the holes 35 in the outside cylinder for co-operation with the lock 27, a pre-stressing nut 36, a lock nut 37 and a wire stretcher 38, one end of which can be screwed tightly to the rod 33 and the other end of which is intended to be connected to the other wire 3. If the force in the wire 3 exceeds the force in the spring 18, the rod 33 can slide in the central hole in the stop 34.

The purpose of the spring 18 is to store energy for thermal changes and to be a position and energy reserve for relaxation in the system. The requirement placed on the spring 18 is that it shall store energy from the forces that exceed the minimal locking force. Additionally it shall be possible to deform it by an amount of the order of magnitude of 5 mm.

As mentioned above and referring again to FIG. 1, the activation unit of the brake is contained in a plastic box 1 and attached to a chassis plate (not shown) equipped with a wire guide (not shown) to steer the wires 2, 3 correctly in relation to the glider 9. The whole activation unit with its chassis plate and surrounding plastic box 1 is easy to place in the vehicle. It is appropriately placed between the back wheels for the shortest wires. The design is very good for adjusting position using the lever 6, because the lever arm 14 has a preferred limited rotational freedom of the order of 0–195 degrees. Position adjustment is an advantage for dynamic braking.

The parking brake is manually activated by the lever 6 placed in the middle console. The maneuver lever 6 can be controlled both manually and automatically, as described in the following with reference to FIGS. 8–10. On its lower end the lever 6 is fastened in a lever base 39 that is rotationally attached to a bracket 40. As mentioned above, the lever unit is placed in the middle console of the vehicle. The lever base can be rotated in the direction of the vehicle and spring loaded in the forward direction with a torsion spring 41. The maneuver lever 6 can be rotated around an axle 42 in the lever base 39 and, as most clearly seen in FIG. 10, it can be rotated sideways a little.

Figure 8:
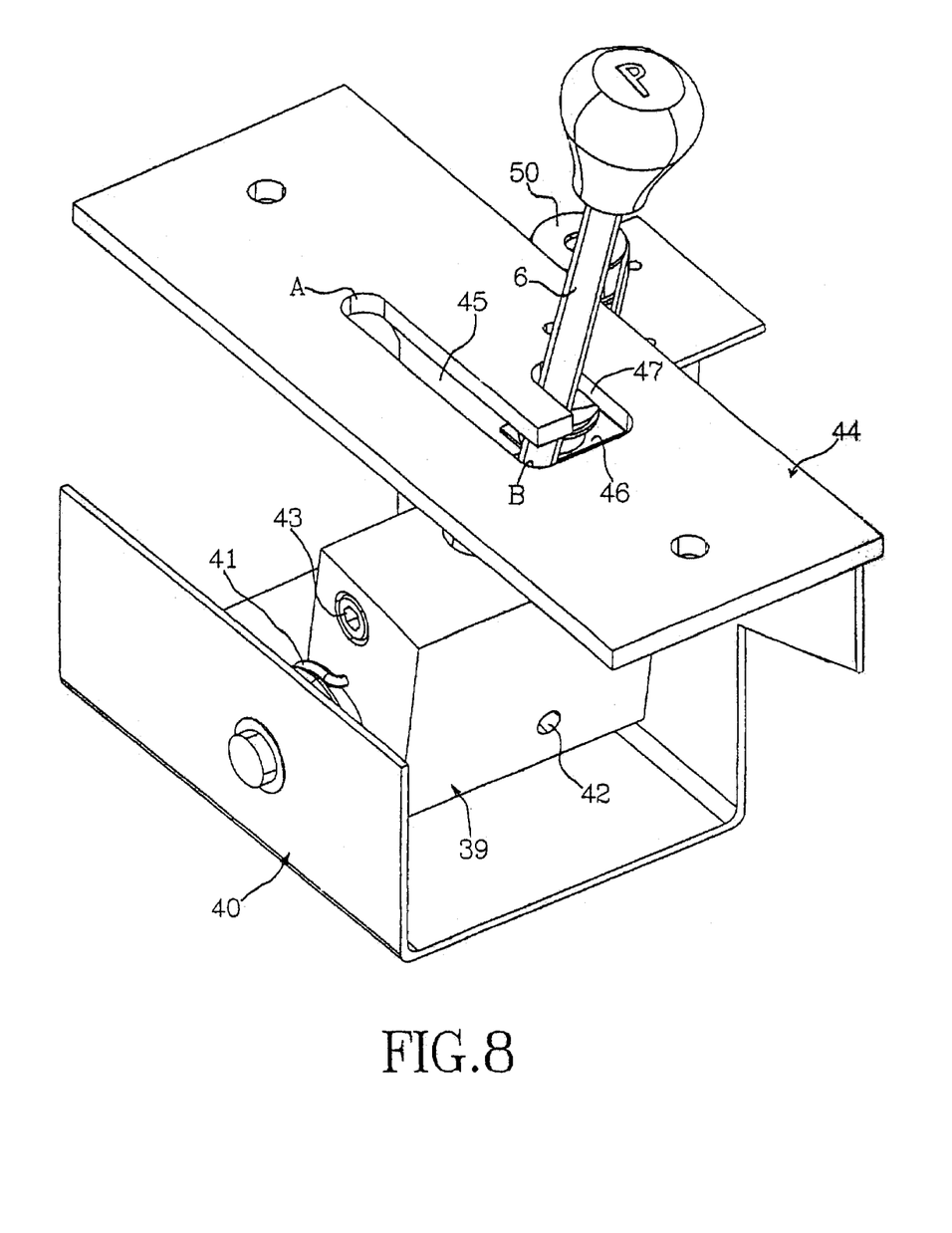
FIG. 8 is a top perspective view of the maneuver lever according to the present invention.
Figure 9:
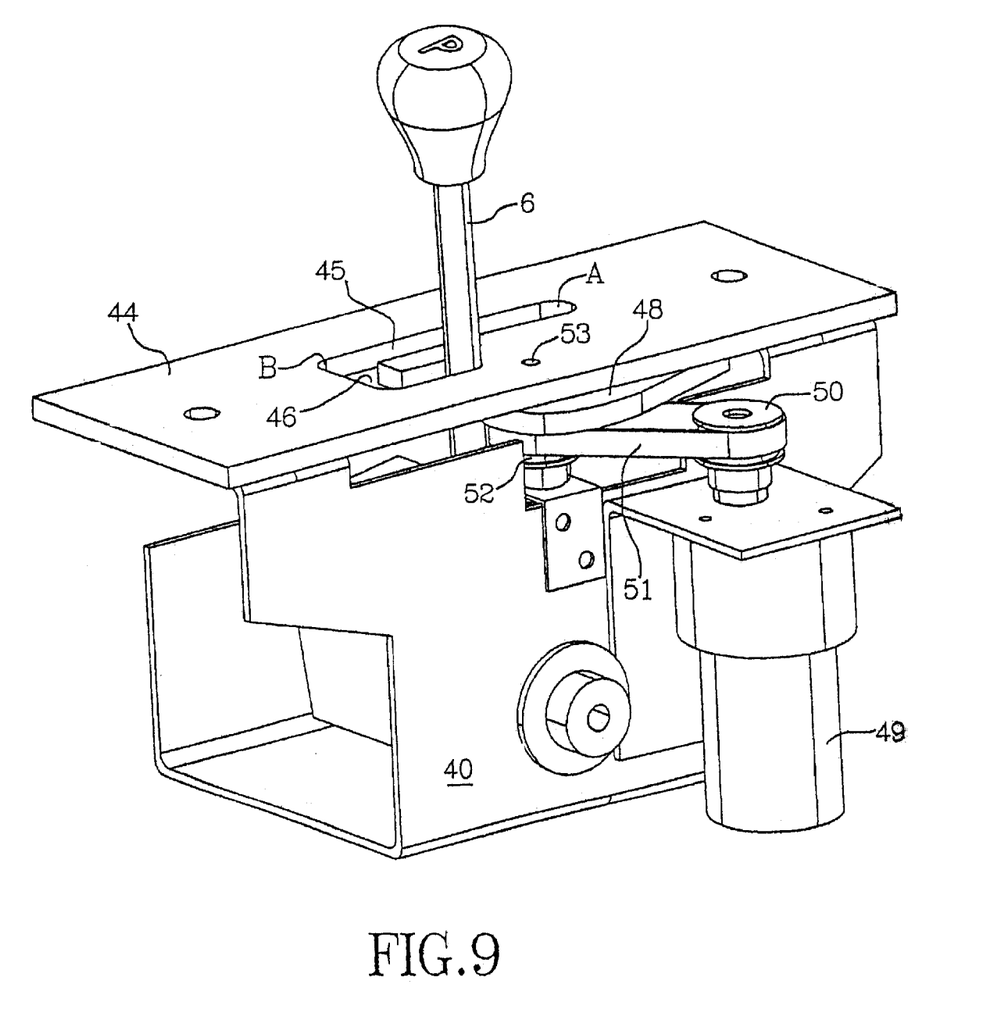
FIG. 9 is a side perspective view of the maneuver lever according to the present invention.
Figure 10:
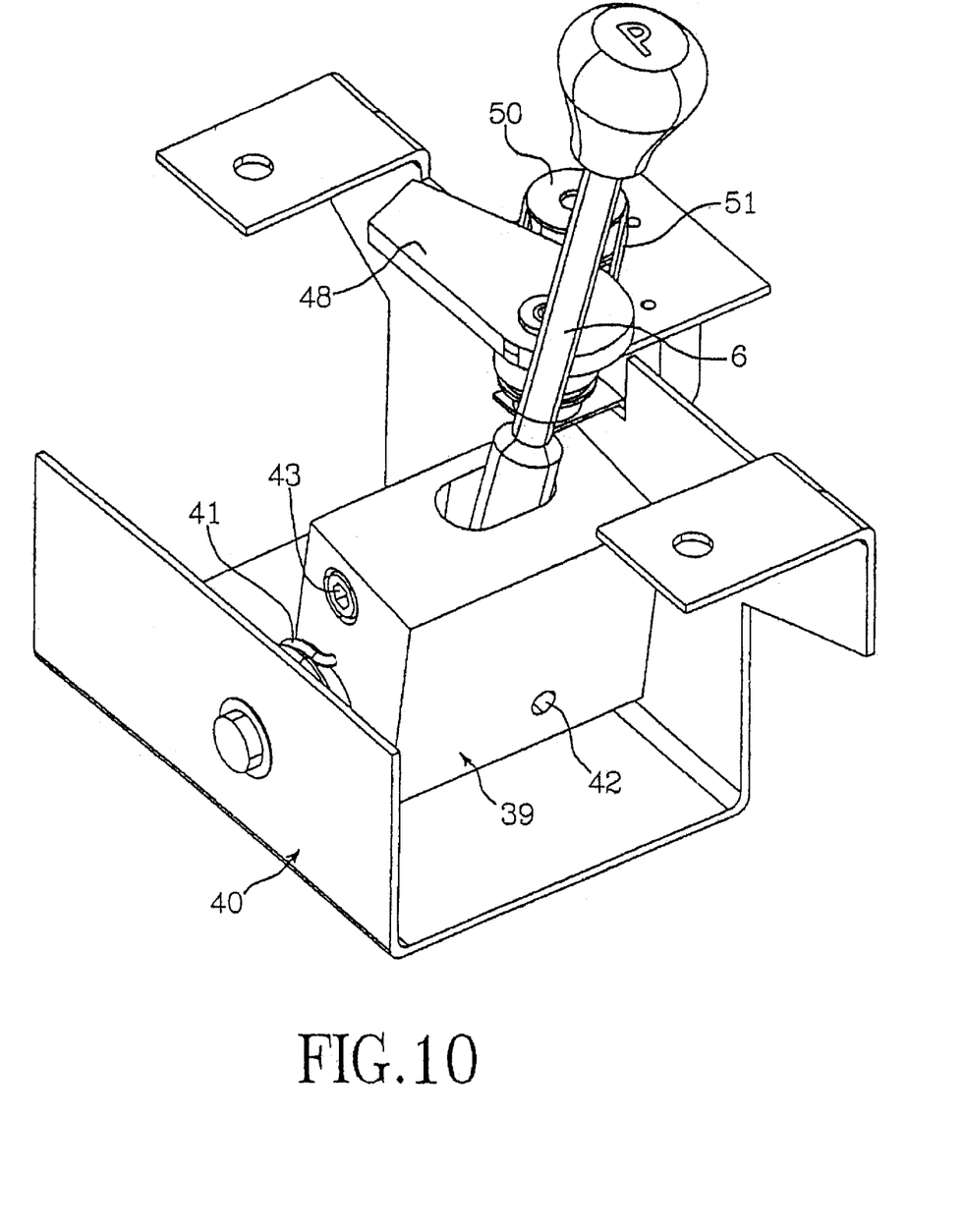
FIG. 10 is a top perspective view of the maneuver lever according to the present invention with the guide plate removed.

Inside the lever base 39 there is a compression spring (not shown) positioned against the bolt 43. The spring is arranged to press the lever 6 toward the right around the axle 42. The path of the lever"' 6 motion is determined by a guide slit 45 in a guide plate 44. It has a control part in the direction of the vehicle. It guides the motion of the lever 6 from the released state at A to the fully applied state at B and vice versa. As mentioned above, the lever base 39 is spring loaded forward by the torsion spring 41. Because pulling the brake wires takes place electrically, the resistance in the lever 6 to the pulling motion in the control part 45 can be set arbitrarily through choice of the torsion spring 41.

When the lever 6 is in position B, that is, completely pulled up, it can be moved to the right along the transverse part 46 of the guide slit 45. The lever 6 is also pressed toward the right in position B by the pressure spring in the base of the lever 6. In the guide slit 45 there is also a locking part 47 in which the lever 6 is held in its applied state. If it is not locked against manual operation, which lock is described below, the lever 6 can be moved out of its locked position in the locking part 47 to position B against the action of the torsion spring 41 and the pressure spring in the lever base 39. The lever 6 does not remain in position B, but is brought to position A by the torsion spring 41 if the driver does not stop it. Dynamic braking can be applied by moving the lever 6 from position A toward position B. The position of the lever 6 in the control part between positions A and B is sensed by a potentiometer (not shown), which produces a control signal proportional to the displacement of the lever 6.

In the apparatus according to the invention, the lever 6 is automatically moved from the totally released position to the fully applied position and vice versa depending on control signals that indicate the situation at hand, for example, the driver leaving the drive'" seat. The automatic motion of the lever 6 takes place through a lever guide 48 that is powered by another electric motor 49. As is most clearly seen in FIG. 9, it is screwed to the outside of the console 40 and has a belt wheel 50 on its output axle. A gear belt 51 transfers the force from the electric motor via a belt wheel 52 to the lever guide 48, which is a lever arm. It can rotate around an axle 53 fastened to the guide plate 43 and the bracket 40.

In FIG. 10, the guide place has been removed to illustrate the function of the lever guide 48. When the lever 6 is in its released position, that is, position A, the lever 6 can be moved to the wholly applied position by the lever guide 48 when it is rotated counter clockwise around its axle 53. When the lever 6 has reached position B, the pressure spring in the base of the lever 6 presses it to the right and further into the locked position in the locking part 47 of the guide slit 45 by the torsion spring 41. In that position the lever 6 can be locked by the lever guide 48 so that manual adjustment of the lever 6 from that position is not possible. The lever 6 can be returned from the locked position to a completely released position by rotating the lever guide 48 clockwise. The lever guide has been shown in a simplified form in FIG. 10. For the lever guide 48 to function in the way intended, its geometric form has to be adjusted to the desired lever motion and locking function.

Figure 11:
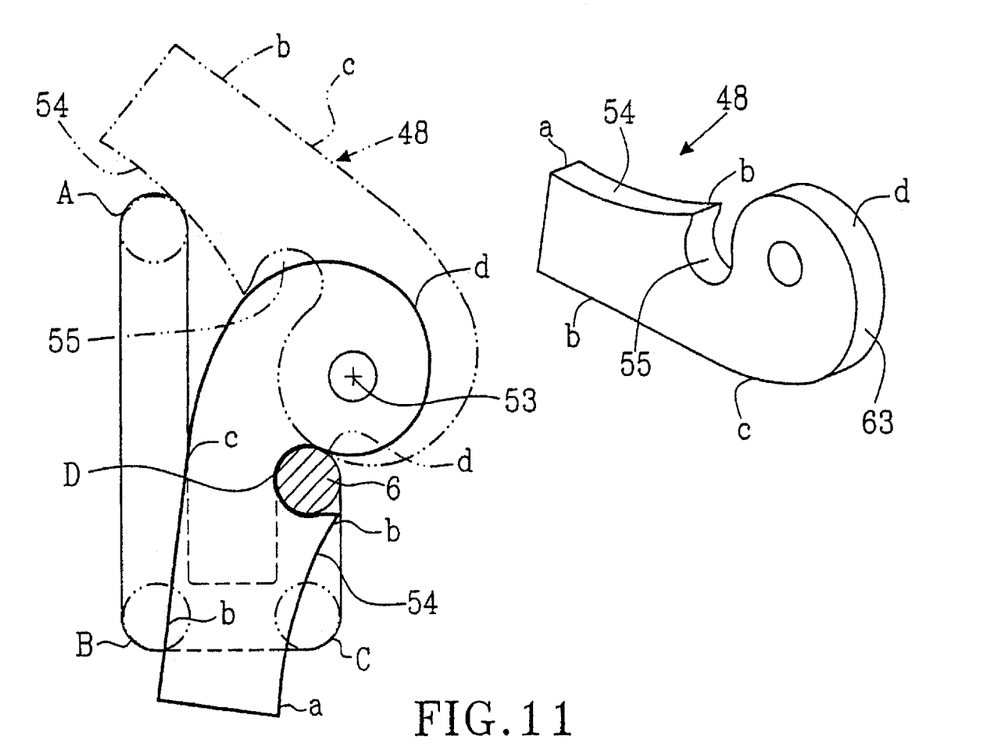
FIG. 11 illustrates an appropriate lever guide arm and its co-operation with the lever according to the present invention.

A preferred embodiment of the lever guide 48 is shown in detail in FIG. 11. In FIG. 11, in addition to the lever guide 48, the guide slit 44 and the lever 6 (only in cross section) are also shown. The lever guide 48, which rotates around the axle 53, is shown in FIG. 11 in two different positions—a locking position (full line) and another position (dashed line) where the lever guide holds a released lever in position A. The lever 6 is moved from position A when the lever guide 48 is rotated counter clockwise during which the lever 6 is moved by a guiding part 54 of the lever guide 48 between positions A and B in the guide slit 45. In the dashed position of the lever in FIG. 11, the guiding part 54 is shown holding the lever 6 in position A. From position B, the lever 6 is brought to the right to position C by the pressure spring in the lever base and then by the torsion spring to the locked position D.

When control signals to the electric motor 49 indicate locking the lever in its locked position, the lever guide 48 is rotated counter clockwise until the locking part 55 of the lever guide 48, in the form of a notch, surrounds the lever 6 as shown by full lines in FIG. 1.

To release the lever from its wholly locked position D the lever guide 48 is rotated clockwise from the lever guide position in FIG. 11 shown in full lines. Then the lever is disengaged from the locking part 55 which is a notch in the lever guide in the shown embodiment. When it is rotated clockwise to the lever position shown with dashed lines in FIG. 11 the release part 63 of the lever guide is engaged with the lever at the position marked d on the lever guide. On further clockwise rotation the distance is increased between the rotation axle of the lever guide and the edge of the lever guide which is engaged with the lever. Against the action of the torsion spring 41 the release part 63 brings it out of position D in the guide slit to position C where the lever guide rotates clockwise and the edge part engaged with the lever moves from d to the position marked c. On further clockwise rotation the lever is moved from position C in the guide slit to position B against the action of a pressure spring when the release part 63 engaged with the lever is moved from position c to the position marked b. When the lever reaches position B it is brought to position A by the torsion spring 41.

In summary the release part 63 between the edge parts d to b moves the lever from position D to B while the guide part 54, limited by the edge parts a and b, brings the lever from position A to position B.

Figure 12:
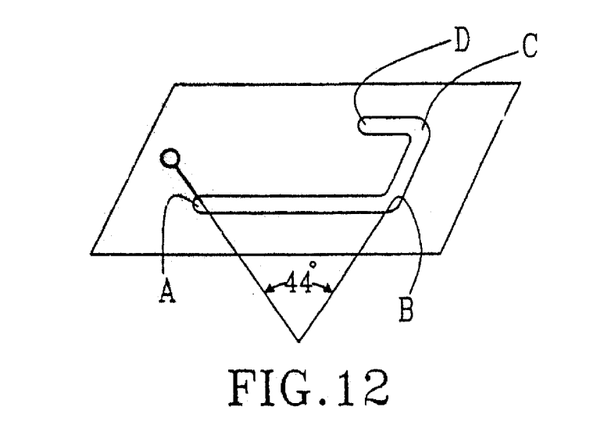
FIG. 12 is a schematic illustration of the angular travel of the lever of the brake activation unit according to the present invention.
Figure 13:
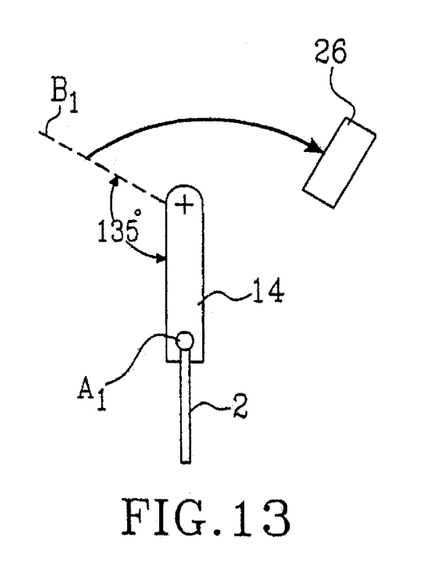
FIG. 13 is a schematic illustration of the angular travel of the lever arm of the brake activation unit according to the present invention.

FIGS. 12 and 13 show the displacement of the lever between the completely released position A and the fully drawn lever, position B, respectively, corresponding to rotating the lever arm 14 in the wire tightening unit. In the embodiment shown the lever is moved 44° between position A and position B and the corresponding displacement of the lever arm 14 from slack wire 2 in position A1 to a position B1 where the braking torque is maximal, for example, of the order of 135°.

The braking torque is controlled by a potentiometer that senses the angular position of the lever. This angular position is compared with a potentiometer on the electric motor 12 of the lever arm 14. The braking torque can thus be controlled so that it is proportional to the displacement of the lever.

In the above mentioned numerical example, for dynamic braking the system rotates the lever arm of the braking unit at least 135 degrees from the original position when the lever is in position B. However, the lever arm of the braking unit shall not reach its maximal braking torque before the lever is in position B, but at position B1 the lever arm of the braking unit in the said numerical example shall have rotated at least 135 degrees from its original position.

When the lever is brought to the locked position, that is, moved between C and D in FIG. 12, the lever arm 14 of the braking unit is moved from position B1 to the stop lug 26. As has been described above in connection with FIGS. 3 and 4, the lever arm 14 takes up a self-locking position when it rests against the stop lug 26.

Figure 14:
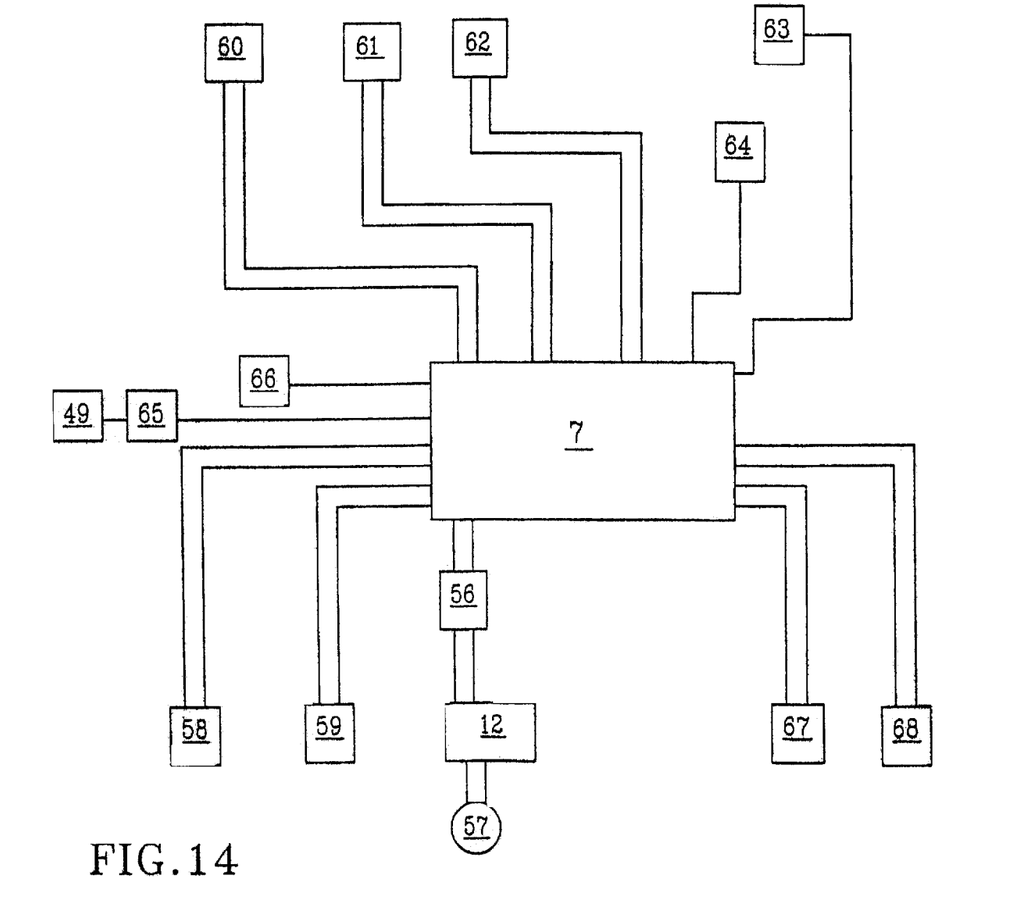
FIG. 14 illustrates one example of an appropriate guide scheme for the parking brake according to the present invention.

The braking system is designed to have a number of automatic functions. It shall be possible to release and apply the parking brake automatically when certain chosen conditions for the respective functions are fulfilled. In FIG. 14 an example of an electrical diagram with details included in the automatic system of the brake is shown, the system being controlled by a control unit 7. The latter is coupled to an electric motor 12 via an ammeter 56 and a potentiometer 57 that is used for comparison with the position of the lever arm 14.

A micro-switch 58 that indicates the applied brake and a micro-switch 59 that indicates the released brake are connected to the control unit. Further, signals from a sensor 60 in an ignition lock that shows key in or key out and signals from a presence detector 61 in the diver'" seat that indicates whether the driver is seated there or not are lead to the control unit 7.

A torque sensor 62 provides information about when the engine is powering the vehicle.

The electric motor 49 that drives the lever guide and the ammeter 65 for the current through the electric motor 49 are coupled to the control unit. Further, the potentiometer 66 that senses the angular position of the maneuver lever is coupled to the control unit 7.

In addition to that which is mentioned above the system appropriately includes two end position sensors 63, 64 for the lever 6, sensors 67 in the door locks that sense whether the doors are locked or not, and sensors 68 in the gear lever and brake pedal.

Another automatic function in the parking brake is automatic release of the brake when the vehicle starts to move. This happens when the following conditions are met:

The ignition is on

The driver is seated

The motor is powering the vehicle.

This has been realized by letting the sensors in the ignition lock and the driver'" seat produce signals to the control unit while the latter retrieves information from the motor electronics.

Obviously, there are times when the brake must not release automatically. Examples include the following cases:

No driver in the driver's seat

The motor is running

The vehicle has been hit

There is no voltage or the voltage has just been applied

Electrical failure, short circuit

These cases may be realized using the sensor in the chair while the motor does not signal powering the vehicle.

The brake shall be applied automatically in the following cases:

When the car rolls backward and a forward gear (first gear) has been chosen

The car rolls forward when reverse gear has been chosen

When the ignition key has been taken out.

Here, the sensor in the ignition lock is used. The control unit must also have information from the sensor in the gearbox for identification of the gear chosen, while the ABS system of the car provides the information that the car is in motion.

Further, it is important that the brake not apply itself in the following situations:

When being towed

When a wheel is locked while the car is moving

When there is an electrical failure

In such instances it is important to be able to turn the automatic control off.

It is always possible to apply the brake, but releasing the brake from its locked maximum position is possible only when the second electric motor is activated and withdraws the lever guide from its locked position.

When the ignition is on and someone is sitting in the driver'" seat, the lever guide has been moved from the locked position and the lever can be maneuvered freely. When no one is seated in the driver'" seat the lever cannot be moved from its locked position. This increases children'" safety.

The system is further appropriately designed such that when the ignition is off and someone is sitting in the driver'" seat, the brake pedal must also be depressed in order that the lever guide be released from its locked position. This also increases children'" safety.

The automatic control of the lever can be changed, of course. The electric braking unit can be of a different type to that which has been described above in connection with FIGS. 2–7. For example the braking unit need not be activated by wires, but be electromechanical brakes applied directly to the respective wheel.

Although the present invention has been described and illustrated in detail, it is to be clearly understood that the same is by way of illustration and example only, and is not to be restricted to the above described embodiments. Rather, many modifications are possible within the spirit and scope of the appended claims.

What is claimed is:

1. An apparatus arranged in connection with a lever for controlling a parking brake intended for vehicles, the parking brake including brake units such as drum brakes or disc brakes on two opposing wheels in a pair of wheels and an electrically driven tightening means for applying or releasing a braking force on the brake units, the apparatus comprising:

at least one sensing means arranged to sense the lever's position and produce control signals to a first electric motor intended to power the tightening means for generation of braking power according to the position of the lever, and the lever being manually adjustable;

a second electric motor arranged to maneuver the lever between a released position in which the parking brake is released and an applied position in which the parking brake is applied according to control signals input to said second electric motor, and said second electrical motor being arranged to lock the lever and prevent hand adjustment when the lever is in a completely applied locking position.

2. The apparatus according to claim 1, further comprising:

a lever guide arm driven by the second electric motor, the lever guide arm being arranged to maneuver the lever so that the lever guide arm brings the lever to different adjustment positions, including a released position and a completely applied locked position, in the completely applied locked position the lever guide arm is arranged to lock the lever and prevent hand adjustment thereof when the lever is in the completely applied locked position.

3. The apparatus according to claim 2, wherein the lever guide further comprises:

a lever arm driven by the second electric motor and a guide part arranged to bring the lever from the released position to the completely applied position.

4. The apparatus according to claim 3, wherein the lever guide further comprises:

a locking part arranged to mechanically lock the lever when the lever is moved to its completely applied locking position.

5. The apparatus according to claim 3, wherein the lever guide further comprises:

a release part arranged to bring the lever out of the locked position to the released position whereby the lever guide is rotated in the opposite direction to the application direction.

6. The apparatus according to claim 1, further comprising:

the lever being attached by a lower end thereof to a lever base that is rotatable in the direction of the vehicle, the lever together with the lever base being rotatable backward from a forward position in which the brake is released toward a back position in which the brake is fully applied, the lever base being spring loaded forward appropriately by a torsion spring whereby pulling the brake by the lever is opposed by the torsion spring, the lever attached to the lever base being rotatable relative to the lever base transverse to the direction of the vehicle, the path of motion of the lever being guided by a guide slit in the guide plate that has a control part extending in the direction of the vehicle which is arranged to guide the lever in its motion backward from its released position to its fully applied position and vice versa, the back part of the guide slit extending to the right in a transverse part and the slit thereafter changing to a short forward facing locking part and a pressure spring is arranged in the lever base intended to press the lever to the right whereby in the fully applied position the lever is pressed to the right by the pressure spring and then into its locking position in the locking part of the slit by the said torsion spring.

7. The apparatus according to claim 1, the parking brake further comprising:
   a glider movable in two opposing directions, a first brake wire attached to one wheel's brake unit being connected to the glider and arranged to extend from the glider in the direction of motion;
   a second brake wire attached to the other wheel and connected to the glider and arranged to extend from the glider in the direction of motion, but in the opposite direction to the first brake wire, the first electric motor and the tightening means being attached to the glider, the tightening means being connected to the first brake wire and the glider being arranged to be moved in the tightening direction so that the applied force in the first brake wire produces a reaction force in the other brake wire whereby the same brake force is distributed to the respective brake units of the wheel pair.

8. The apparatus according to claim 7, wherein the tightening means further comprises:
   a lever arm, the first wire being fastened on a lever arm peg placed on the lever arm at a distance from a center of rotation thereof and arranged so that upon tightening the first wire, the lever arm is arranged to make a rotational motion during which the lever arm peg is brought around the rotation center from a starting position to a final position at a stop lug, the stop lug being arranged so that in the final position, the force vector of the first wire locks the lever arm mechanically against the stop lug.

9. The apparatus according to claim 7, wherein the wires are coupled to an energy storage spring on the glider arranged to compensate for thermal changes and possible relaxation in the wire system.

10. The apparatus according to claim 9, wherein the second wire is coupled to the spring and the arrangement includes a manual mechanical release mechanism arranged to allow mechanical release of the parking brake when one of the electric motors is not in operation.

11. The apparatus according to claim 10, wherein the release mechanism includes a locking means that in its normal position holds the spring in place on the glider and a release wire arranged to move the release mechanism out of its engaged position through manually pulling the wire against the action of a pressure spring whereby the brake unit is released on moving the spring relative to the glider, a return is attached to the spring and arranged to move with it on moving the spring in connection with its release, the return having a part that when the brake is released mechanically is on the opposite side of the lever arm peg relative to the spring as seen in the direction of the motion of the glider, the return being shaped so that the part is moved by the lever arm peg when after mechanical release of the brake the electric motor is again activated and is returned to its initial position whereby the spring is brought to its normal position and the lock is brought to hold the spring in place through the action of the pressure spring.

12. The apparatus according to claim 1, wherein the lever for guiding the parking brake is placed near a driver'" seat of the vehicle and the tightening means and the first electric motor are arranged between or near the wheels.

13. The apparatus according to claim 1, wherein the control unit is arranged to control the first and the second electric motors depending on input signals from a number of sensors, including the sensors for the position of the lever, a sensor in the ignition lock that indicates whether the ignition key is inserted, a presence detector in the driver'" seat indicating whether the driver is seated in the seat, and sensors for indicating whether the parking brake has been set or released.

14. An arrangement for controlling a parking brake of a vehicle, the arrangement comprising:
   a parking brake having a brake unit associated with a wheel of the vehicle and an electrically driven tightener for applying and releasing a braking force on the brake unit;
   a manually adjustable brake lever and at least one sensor arranged to sense the brake lever's position, the sensor adapted to provide control signals to a first electric motor configured to power the tightener for generation of braking power dependent upon a sensed position of the lever; and
   a second electric motor arranged to maneuver the lever between a released position in which the parking brake is released and an applied position in which the parking brake is applied according to control signals provided thereto, said second electrical motor configured to lock the lever and prevent hand adjustment when the lever is in a completely applied locking position.

15. The apparatus according to claim 14, wherein the brake lever is placed near a driver's seat of the vehicle and the tightener and the first electric motor are arranged between opposed wheels of the vehicle.

16. The apparatus according to claim 14, further comprising:
   a control unit configured to control the first and second electric motors depending on input signals from a plurality of sensors.

17. The apparatus according to claim 16, wherein said plurality of sensors includes a sensor that detects the position of the lever, a sensor that detects the presence of an ignition key in the ignition lock, a sensor that detects the presence of an occupant in a driver's seat of the vehicle, and a sensor for detecting between set and released positions of the parking brake lever.

\* \* \* \* \*

UNITED STATES PATENT AND TRADEMARK OFFICE
CERTIFICATE OF CORRECTION

PATENT NO. : 6,648,107 B2
DATED : November 18, 2003
INVENTOR(S) : Lundholm et al.

It is certified that error appears in the above-identified patent and that said Letters Patent is hereby corrected as shown below:

<u>Title page,</u>
Item [73], the city/country of the Assignee should read -- Volvo Personvagnar AB, Göteborg (SE) --
Please add:
-- [30]     Foreign Application Priority Data

October 1, 1998     (SE)     . . . . . . . . . . . . . . . 9803337-6 --

Signed and Sealed this

Sixteenth Day of March, 2004

JON W. DUDAS
*Acting Director of the United States Patent and Trademark Office*